(12) United States Patent
Pinault et al.

(10) Patent No.: US 8,551,618 B2
(45) Date of Patent: Oct. 8, 2013

(54) GROWTH OF CARBON NANOTUBES ON CARBON OR METAL SUBSTRATES

(75) Inventors: Mathieu Pinault, Antony (FR); Mathieu Delmas, Toulouse (FR); Martine Mayne L'Hermite, Les Molieres (FR)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 459 days.

(21) Appl. No.: 12/867,318

(22) PCT Filed: Feb. 17, 2009

(86) PCT No.: PCT/FR2009/050247
§ 371 (c)(1),
(2), (4) Date: Aug. 12, 2010

(87) PCT Pub. No.: WO2009/103925
PCT Pub. Date: Aug. 27, 2009

(65) Prior Publication Data
US 2010/0323207 A1  Dec. 23, 2010

(30) Foreign Application Priority Data

Feb. 20, 2008  (FR) ...................................... 08 51094

(51) Int. Cl.
*B32B 9/00* (2006.01)

(52) U.S. Cl.
USPC ............................ 428/408; 423/448; 977/742

(58) Field of Classification Search
USPC .................... 428/408; 423/447.1, 447.2, 448; 977/742
See application file for complete search history.

(56) References Cited

U.S. PATENT DOCUMENTS

2005/0176329 A1  8/2005  Olry et al.
2005/0287064 A1  12/2005  Mayne et al.
2007/0128960 A1  6/2007  Ghasemi et al.

FOREIGN PATENT DOCUMENTS

FR  2 841 233  12/2003
FR  2 844 510  3/2004

OTHER PUBLICATIONS

Takagi et al., *Carbon Nanotube Growth from Semiconductor Nanoparticles*, © American Chemical Society, Published on Web Jul. 19, 2007.
Database WPI Week 20058, XP-002499930; dated Mar. 11, 2008.
Database WPI Week 200413—XP-002499931; dated Mar. 11, 2008.
Lee et al., *Growth of Well-Aligned Carbon Nanotubes on a Large Area of Co-Ni Co-Deposited Silicon Oxide Substrate by Thermal Chemical Vapor Deposition*, Chemical Physics Letters, Jun. 23, 2000, XP-002499929.
Li et al., *Controlled Growth of Carbon Nanotubes on Graphite Foil by Chemical Vapor Deposition*, Chemical Physics Letters 335 (2001) 141-149, Feb. 23, 2001, © 2001 Elsevier Science B.V.
International Search Report and Written Opinion of counterpart International application PCT/FR2009/050247, report dated Dec. 23, 2009.

*Primary Examiner* — Maria Veronica Ewald
*Assistant Examiner* — Daniel H Miller
(74) *Attorney, Agent, or Firm* — Miller, Matthias & Hull LLP

(57) ABSTRACT

The invention relates to the growth of carbon nanotubes on a substrate, in particular a carbon or metal substrate on which the growth of such nanotubes is usually difficult. Accordingly, the invention includes a first phase that comprises depositing a ceramic sub-layer, followed by a second phase that comprises depositing carbon nanotubes on said sub-layer in a single step and in a single and same growth reactor. The growth can advantageously be carried out by chemical vapor deposition.

22 Claims, 6 Drawing Sheets

GROWTH OF CARBON NANOTUBES ON CARBON OR METAL SUBSTRATES

CROSS-REFERENCE TO RELATED APPLICATIONS

This application is a U.S. national stage filing under 35 USC §371 of International Patent Application No. PCT/FR2009/05027 filed on Feb. 17, 2009, which claims priority under the Paris Convention to the French Patent Application No. 08 51094, filed on Feb. 20, 2010.

FIELD OF THE DISCLOSURE

This invention relates to the production of composite materials based on carbon nanotubes.

More particularly, it relates to the growth of carbon nanotubes by chemical vapor deposition (CVD) on carbon or metal substrates.

BACKGROUND OF THE DISCLOSURE

Carbon nanotubes have advantageous mechanical, electrical, and thermal properties at the nanoscopic scale. Because of their unique structure, dimensions, and form factor (high length/diameter ratio), nanotubes are proving to be very promising in terms of applications. They can be used for replacing conductive paths in integrated circuits because of their low migration tendency, their high maximum currents, and other properties. Studies show that these nanostructures develop a very high tensile strength and that their electrical behavior can vary from semi-conductive to metallic depending on their structure. This electrical conductivity is accompanied by excellent thermal conductivity. Therefore the idea of incorporating them into composite materials quickly made an appearance.

The properties of currently manufactured composite materials already seem satisfactory for many applications. However, an improvement in the thermal and electrical conductivities as well as in the mechanical performance would expand their fields of application, particularly for airplane fuselages, disk brakes, and other such applications.

In the current context which favors the development of composite materials based on carbon fibers, true progress would be a solution resulting in obtaining on a macroscopic scale the properties of carbon nanotubes that appear on a nanoscopic scale. However, the mechanical and thermal performance obtained by employing carbon nanotubes as the conventional filler for composites is debatable, while the electrical conductivity properties obtained in composites with carbon nanotube fillers is satisfactory. To improve the effectiveness of incorporating carbon nanotubes into composite materials and ultimately improve the properties of the resulting material, several paths were considered. Two of the main ones are described below. It is in fact possible:

- to align carbon nanotubes within a matrix of the composite (polymer for example),
- to integrate carbon nanotubes into an existing reinforcement of the composite (a reinforcement such as fiberglass, alumina fiber, or carbon fiber for example).

Carbon nanotubes can therefore be incorporated into the reinforcement or matrix system in an ordered or unordered manner and must ideally have cohesion with the reinforcement fibers.

Direct growth of nanotubes on carbon fibers has thus been considered. The carbon nanotubes obtained on the fibers may be unordered.

Another path would be to produce them so they are perpendicular to the axis of the fiber, the way they already are on flat substrates (of silicon, quartz, or other material) when certain growth methods are used. This last configuration, with carbon nanotubes oriented perpendicularly to the axis of the fibers, should result in an increase in the contact area between the reinforcement formed by the woven fibers and the surrounding polymer matrix, encouraging the transfer of thermomechanical properties, which potentially should increase the thermal conductivity properties of the composite. A method which could result in this type of material enabling such a transfer of properties on the macroscopic scale and which could be applied on the industrial scale, continuously or semi-continuously, would be of undeniable interest.

Growing carbon nanotubes on carbon substrates of any type (flat surface, fibers, foam, particles) is known to be problematic. Results obtained to date show growths of short and tangled carbon nanotubes on carbon surfaces, of a very low density, not at all comparable to the dense and aligned "carpets" obtained on quartz or silica type substrates. Some studies even mention an absence of growth. These growth problems are also encountered on other types of substrates besides carbon substrates, particularly metals (stainless steel, palladium, gold, etc.).

Growth on carbon substrates, such as carbon fibers, is generally achieved by chemical vapor deposition (CVD).

The CVD growth techniques employed are based on the breaking down of a carbon-containing gas by metal particles (referred to as "catalyst particles"), in a furnace. Two main types of methods can be distinguished:

- the pre-impregnation method, in which the particles are created before the actual growing of the carbon nanotubes, and which is implemented by soaking in solutions of appropriate metallic salts, followed by an injection of carbon-containing gases for growing the carbon nanotubes,
- the method of injecting and vaporizing in a furnace a solution of an organometallic compound in an organic solvent which is the carbon source.

Some studies propose applying surface treatments to the fibers to encourage the growth of carbon nanotubes on their surface. Some of these methods have improved the tube growth (in terms of density, length, or other aspects) but the results remain far below the results obtained on substrates other than carbon or metal substrates.

A study by W. Z. Li et al, published in Chem. Phys. Lett., vol. 335, pages 141-149 (2001) was conducted on a flat substrate of graphite, coated by sputtering a stainless steel film (Fe:Cr:Ni=70:19:11), which, after annealing, led to the formation of stainless steel particles of a size that varied with the thickness of the film deposited on the surface of the graphite film. The carbon nanotubes were grown for an hour at a temperature of 660° C., using acetylene diluted in nitrogen. For a particle size of 40 nm, the scanning electron microscopy (SEM) images show a growth of not very dense carbon nanotubes, and nanotubes which are disordered horizontally to the substrate surface. The nanotubes seem to only form on particles that are spherical, and not on particles that have coalesced and have random shapes.

It seems that the results for Fe/Ni alloys on graphite are more encouraging than those for Fe or Ni alone, because under the same conditions, the carbon nanotube growth takes place on the alloy particles and not on the pure metal particles.

Studies conducted to date concerning the growth of carbon nanotubes on carbon fibers (of any type) include few conclusive studies using the CVD technique. Most of the protocols consist of impregnating the fibers before the CVD deposition, via the wet process, and reduction.

The impregnation is done by soaking fibers in a solution (aqueous or organic) of transition metal salts (iron, nickel, cobalt, or a mixture of these). The fibers are then heated in a reducing atmosphere to allow the formation of catalyst particles. Then the growth of carbon nanotubes is achieved by heating in a furnace into which a current of carbon-containing gas is directed. The resulting morphology is a thin sheath (a few micrometers) formed of carbon nanotubes around the carbon fiber. The carbon nanotubes are not very dense and are unordered surrounding the carbon fibers, and more or fewer carbon particles (sub-product of the synthesis reaction) are agglomerated around them.

Studies that do not use impregnation are inconclusive. One can cite patent FR-2 841 233 which shows a growth of nanotubes on carbon fibers that is not very dense, short in length, and without orientation, while carpets of dense and aligned carbon nanotubes are obtained on quartz or silicon substrates under the same growth conditions. The treatments mentioned in the literature for carbon fibers are most often oxidation treatments and consist primarily of chemical treatments (acids, hydrogen peroxide), and plasma treatments (corona or other) with variable atmospheres. Other types of treatments are mentioned in numerous publications, whether for functionalizing the fiber surface to improve the fiber-matrix interface, or encouraging the anchoring of nanotubes or chemical functions to the surface. Here again, the techniques discussed are generally chemical or physicochemical in nature (combining plasma and chemical deposition, for example silsesquioxane), or concern gamma irradiation.

The most common surface treatment involving deposition of sub-layers for this system consists of soaking in a solution of organosilicons and metal salts that are precursors of catalyst particles. This is hydrolyzed by adding acid to the bath. A coarse film, including the precursor metal salts primarily composed of silica ($SiO_2$), then forms on the surface of the fibers. Once dried, the fibers covered in this manner are brought to a high temperature (typically 800° C.) in a reducing atmosphere (inert gas with several percentages of hydrogen added) in order to reduce the metal salts into catalyst particles. The resulting $SiO_2$ film serves both as a diffusion barrier for the later growth of carbon nanotubes and as anchor sites for the catalyst particles (pre-impregnation techniques), as is described in patent FR-2 844 510. In general, a compound such as tetraethyl orthosilicate (TEOS) or 2(4-chlorosulfonylphenyl)ethyltrichlorosilane is used. Certain studies were able to show excellent nanotube anchoring by this method. The condition of the fiber surface after treatment based on organosilicons remains rough, however, having a micrometric thickness that is already fissured. It is also not very adherent, but the carbon nanotubes obtained form a continuous layer of tangled tubes that are at most several micrometers in length.

In patent application U.S. Ser. No. 11/523,731, a micrometric deposit of silicon carbide (SiC) is applied to the fibers before the carbon nanotubes are grown. This involves coating the fibers with a polymer precursor which is then polymerized at 200° C., then pyrolyzed at 1000° C. for an hour. The process enables the formation of a film of SiC that is several micrometers thick. The carbon nanotubes are grown on these coverings in a second step. The observed growth is dense and radial. However, the thickness of these SiC layers can pose problems concerning the mechanical properties of the composite formed.

The feasibility of growing carbon nanotubes on carbon fibers by aerosol-assisted CVD deposition, with the use of an organometallic precursor solution such as metallocene in a hydrocarbon, is explained in the document corresponding to published patent PCT/FR05/00201. Various surface treatments are suggested, particularly the application of nanometric layers of $SiO_2$, SiO, SiC. Only the application method for SiO is described in detail, involving a phase of evaporating commercial SiO at 1100° C. However, the growth of carbon nanotubes during the second step of these processes remains sporadic and slow. The results illustrated remain far below the densities obtained on oxide substrates ($Al_2O_3$ fibers for example). The general orientation of the nanotubes is vertical, but in no case is this aligned with or perpendicular to the axis of the fiber.

In general, the following points are clear from the research mentioned above:
growing carbon nanotubes on carbon substrates is difficult,
the density of the carbon nanotubes obtained is generally low, and even very low, with no noticeable improvement by simple methods (such as synthesis parameters),
the length of the carbon nanotubes obtained is often small and difficult to control, with slow growth rates,
the nanotube morphology presents numerous defects (particularly curvature),
the arrangement of the carbon nanotubes is random or can tend towards a particular orientation without obtaining a growth of carbon nanotubes that are actually aligned.

Current studies show that it is difficult to grow carbon nanotubes on fibers when these fibers were not previously treated. Pretreating the surface constitutes a prior step separate from the step of growing the carbon nanotubes, particularly in its use of a treatment method that is clearly different from the deposition method. Only with difficulty does such pretreatment lead to a noticeable improvement in growth.

In spite of adaptations to the processes or pretreatments employed, the studies show an inability to equal, in terms of density, alignment, or length, the growth of carbon nanotubes obtained on substrates such as quartz.

SUMMARY OF THE DISCLOSURE

The invention improves this situation by enabling the growing of carbon nanotubes:
on carbon fibers,
on carbon substrates, or
on metal substrates,
in a manner that is dense and aligned, meaning that is comparable to the growth on substrates other than carbon or metal. In particular, it enables obtaining neat, dense, and aligned carbon nanotubes on carbon fibers, and more generally on any carbon or metal substrate where the growth of carbon nanotubes was difficult or nonexistent in the prior art.

DETAILED DESCRIPTION OF THE DISCLOSURE

The invention proposes a method for preparing carbon nanotubes on a substrate, in a reactor. In particular, this method can advantageously be implemented in a single and a same device.

The method of the invention comprises a single step resulting from sequentially performing the two successive phases below:
a first phase, of forming a ceramic sub-layer on a substrate, for example by introduction into the reactor, then pyrolysis, of a sprayed first liquid containing a ceramic precursor, and a second phase, of growing carbon nanotubes on this sublayer, for example by introduction into the same reactor, then pyrolysis, of a sprayed second liquid containing a carbon precursor of carbon nanotubes, as well as, advantageously, a metal precursor that is a catalyst of carbon nanotube growth.

The invention applies to a large number of substrates, particularly carbon or metal substrates.

The substrate generally corresponds to the surface of a body receiving a deposit. The body itself may have a composition (excluding the surface) which can be variable and dissimilar, or simply similar, to that of the surface receiving the deposit.

"Carbon" substrate is understood to mean a substrate essentially consisting of a carbon skeleton. It may, for example, be an allotropic form of carbon such as graphite, for example grapheme, diamond, carbon in amorphous form, fullerenes, such as carbon nanotubes, nanocolumns, nanohorns, carbon foam, glassy carbon, or carbon fibers. Of the carbon substrates, carbon fibers are preferred for implementing the invention.

"Metal" substrate is understood to mean, in the context of the invention, a substrate consisting of a metal, particularly palladium (Pd), platinum (Pt), gold (Au), chrome (Cr), and manganese (Mn), or a metal alloy such as stainless steel or Fe—Ni. Of the metal substrates, stainless steel is preferred for implementing the invention, for example the composition known as grade 316L.

The process is generally carried out in a chemical vapor deposition (CVD) reactor. This is typically an enclosed vessel resistant to high temperatures and reduced pressures. The interior is generally coated with quartz or stainless steel.

Pyrolysis allows the chemical decomposition of the precursors contained in the first liquid (denoted A below) for forming the ceramic sub-layer and the second liquid (denoted B) for forming the carbon nanotubes. It is performed at a sufficient temperature to ensure the decomposition of the precursors. Typically, it is done at a temperature between 200 and 1100° C. at a pressure between 20 mbar and 1000 mbar.

In the sense of the invention, a "ceramic precursor" corresponds to a compound which when broken down by pyrolysis results in the formation of a ceramic.

Distinguished among these ceramics are the oxide ceramics such as $SiO_2$, $Al_2O_3$, $ZrO_2$, and $TiO_2$, and the non oxides such as SiC, SiCN, SiON or SiOCN.

Notable ceramic precursors are $Si(OEt)_4$ (TEOS), $(iPrO)_3Al$, $(BuO)_4Zr$, $(BuO)_4Sn$, HMDS (for hexamethyledisilazane), 4-DMAS (tetrakis(dimethylamino)silane), or others.

The liquid A generally comprises a solvent in which the ceramic precursor is dissolved or suspended. It is generally an organic solvent that is liquid at ambient temperature and pressure, such as a hydrocarbon, for example benzene and its derivatives, such as toluene and xylene, or alkanes such as cyclohexane, hexane, or heptane. Preferably, the solvent is chosen as not significantly reacting with the ceramic precursor. The precursors are available commercially and it is advantageous to use, possibly as a solvent in the context of the invention, the solvents in which the precursors are habitually stored for commercial distribution.

As for the carbon nanotube precursors, these are generally a mixture of a carbon source and a metal catalyst source. For the carbon source, it is possible to use a hydrocarbon in particular, generally in liquid form at ambient temperature and pressure, for example benzene and its derivatives such as toluene and xylene, or alkanes such as cyclohexane, hexane, or heptane. In addition, it is important to note that this hydrocarbon liquid may contain one hydrocarbon or a mixture of several hydrocarbons, of chosen proportions. Generally, the carbon source also acts as the solvent for the liquid B.

The catalyst preferably comprises a metal, such as a transition metal (Fe, Co, Ti or Ni), or a noble metal (Pd, Ru, Pt) for example. The metal can be in the form of nanoparticles or in the form of an organometallic compound. When the catalyst is in the form of nanoparticles, it is generally in colloidal suspension in the carbon source. For an organometallic catalyst, one can cite metallocenes such as ferrocenes, nickelocenes, cobaltocenes, and ruthenocenes, or phthalocyanines, particularly of iron or nickel. The catalyst can also be chosen from among metal salts for example, such as nitrates, acetates, or acetylacetonates. It is of course understood that the solution can be constituted of either a solid organometallic compound or a mixture of solid compounds, dissolved in liquid hydrocarbon or in a mixture of liquid hydrocarbons, it being understood that preferably the solid product is soluble in the liquid.

The liquid B can additionally comprise one or more compounds to encourage the growth of carbon nanotubes, such as thiophene or rare earth precursors (Y, La, Ce or others).

The components of the liquid B can be selected to comprise heteroatoms, such as N (nitrogen), P (phosphorus) or B (boron), to dope the carbon nanotubes. It is also possible to add a compound to the liquid B comprising one or more heteroatoms. Generally, the heteroatoms can be present in the solvent that was appropriately selected. Thus, it is possible to employ benzylamine or acetonitrile to obtain carbon nanotubes doped with nitrogen, diphenylphosphine can be used for phosphorus doping, and boranes, borazines for boron doping.

It is also possible to dope the ceramic sub-layer during formation in order to render it conductive in some applications.

The term "spraying" is also understood to mean the forming of finely divided liquid particles, such as droplets. The finely divided liquid particles, such as droplets, have a dimension of a few tenths of a micron to a few hundred microns, preferably from 0.1 to 300 microns.

The spraying of the liquids A and B can be done for example using an injector which can operate in pulses, with a number of pulses that is generally from 0.9 to 1200 per minute. At each pulse a volume of liquid is injected which varies as a function of the period a needle valve is open (generally from 0.5 to 12 ms) and of the liquid used.

It is possible to evaporate in an evaporation device the finely divided particles, such as droplets, formed by such an injection system, prior to their introduction into the reaction vessel. In fact, it can be highly advantageous to vaporize the sprayed liquids before their introduction into the reactor. For this purpose, it is possible to introduce the sprayed liquids into an evaporator first. The evaporator can for example consist of a heating device and/or a decompression device.

The sprayed or subsequently sprayed liquids are advantageously introduced into the reactor with the assistance of a carrier gas. An aerosol A, consisting of the liquid A and a carrier gas, can thus be distinguished from an aerosol B, consisting of the liquid B and a carrier gas, in order to control their pressure and flow rate independently.

For the carrier gas, it is possible to employ one or more compounds existing in gaseous form at ambient temperature and pressure. This can be any type of gas, particularly an inert gas Ar (argon), He (helium), $N_2$ (nitrogen), or $H_2$ (hydrogen), or a mixture of these. In one embodiment, this is typically argon or a mixture of argon and hydrogen. The use of a carrier gas comprising heteroatoms, such as nitrogen N and/or its derivatives ($NH_3$, $N_2H_4$, etc.) for example, in either of the phases can be taken advantage of in order to dope the ceramic or the carbon nanotubes.

The sprayed liquids can be introduced continuously or discontinuously. It is recommended that the introduction take place discontinuously, which is then referred to as pulsed injection. Each of the pulses corresponds to the introduction of a given quantity of liquid or aerosol into the system. The frequency of the pulses is typically between 2 and 50 Hz in order to achieve the desired type of coating under good conditions.

The choice of experimental conditions for the first and second phase is determined by user expectations and can be adapted. In fact, variations in parameters such as the thickness of the material deposited on a substrate, for example the sub-layer, the length of the carbon nanotubes, or the doping, are elements for which there are bibliographical data in the field of CVD deposition. For example, it is possible that lengthening the duration of the first phase leads to the formation of a thicker layer of ceramic, while a longer second phase leads to the formation of longer carbon nanotubes.

The first phase is generally conducted at a temperature of 200 to 1000° C., preferably 700 to 1000° C. for the TEOS precursor and 450 to 700° C. for titanium tetraisopropoxide (or TTiP), and a pressure of 30 to 150 mbar. As an illustrative example, for a 1 mole per liter solution of TEOS in toluene and an injection rate of 1 to 10 Hz (optimal between 2 and 4 Hz), with the valve open period being fixed between 1 and 3 ms, the deposition/injection time can typically be between 10 seconds and 10 minutes and is optimal between 20 seconds and 4 minutes. Advantageously, the first phase is conducted so that the thickness of the sub-layer is nanometric in size. More particularly, the thickness of the layers obtained can vary from 20 to 500 nm depending on the parameters and the deposition time, as well as on the type of precursors used. This thickness can be observed and determined by scanning electron microscopy (SEM) or by an electron microprobe.

As will be seen below, the sub-layer then appears to "conform" to the surface of the fibers, meaning that the layers obtained adopt the contours of the surfaces on which they are growing and all the irregularities and unevenness of the surface are covered uniformly.

The second phase is generally conducted at a temperature of 700 to 1100° C., preferably between 800 and 900° C., and a pressure of 200 to 1000 mbar. The duration of the second phase is a function of the desired size of the carbon nanotubes and the capacity of the synthesis reactor. It can vary from several minutes to several hours. As an illustration, for a 2.5% ferrocene solution by weight in toluene, the injection parameters used can be a frequency of 17.7 Hz, an open period of 0.5 ms, a furnace temperature of 850° C., and an evaporator temperature of 200° C. at atmospheric pressure.

The first phase and the second phase are successively performed in the same reactor, in particular without exposure to the outside atmosphere. It may be advantageous for the sub-layer to be deposited at low pressure, then to increase the pressure in the growth reactor to substantially the atmospheric pressure before performing the second phase.

The furnace temperature is increased to reach the temperature necessary for the deposition of the sub-layer. The rate of the temperature increase can vary because it has no impact on the final material formed, as the reagents are not present in the reactor during the temperature increase. Once the furnace reaches the desired temperature and the pressure in the reactor is adjusted to the desired value, generally less than the atmospheric pressure and usually about 50 mbar, the first injector is activated.

At the end of the first phase, the pressure in the reactor is raised to substantially the atmospheric pressure. Then the second injector is activated, using the appropriate injection parameters for the carbon nanotube growth.

The process can be terminated after very short periods (of a few minutes) or can be continued for a longer time depending on the reactor capacity and desired tube length, and on the targeted properties.

The carbon nanotubes obtained by the process are in the form of a dense carpet and the nanotubes are aligned, their main axes substantially perpendicular to the substrate surface (or the sub-layer in particular) receiving the deposition. The density of the carbon nanotubes is comparable to that observed on a substrate of Si or quartz, meaning on the order of $10^9$ to $10^{10}$ nanotubes per $cm^2$. This density can be estimated by analysis of SEM images or by measuring the gain in mass on the substrates used.

The synthesis yield obtained is satisfactory. It can be estimated by simple comparison of the mass of carbon nanotubes formed and the mass of reagents injected. An experimentally measured result in the context of the invention was between 8 and 40%.

The invention also concerns the product obtained by implementing the method of the invention, in particular a multi-layer structure comprising at least one ceramic sub-layer (for example a layer of a first oxide and another layer of a second oxide) and the layer of carbon nanotubes deposited on the sub-layer and forming a dense and tight carpet of a thickness which can vary from several micrometers to several dozen millimeters.

The invention also concerns the substrates covered with such a structure comprising at least one ceramic sub-layer and a layer of carbon nanotubes in the sense of the invention. A first type of substrate can be a reinforcing fiber (particularly a carbon fiber). The invention then also concerns composite materials of an organic, ceramic, or polymer matrix, incorporating such reinforcing fibers treated by applying the method of the invention.

A second type of substrate can be a metal substrate used for example in a material for storing energy (in a supercapacitor, a fuel cell, etc.). Also, such a material possesses properties enabling its additional or alternative use as a thermal interface material for the purposes of heat transfer.

The invention also relates to a device for implementing the process, described below in an exemplary embodiment with reference to FIG. 15.

The process presented allows reactor production of aligned nanotubes in the form of a carpet, with a significant catalytic yield. In addition, it is adapted for growing on all types of substrates resistant to the pyrolysis temperature. The process described grows dense and aligned carbon nanotubes on practically any type of substrate, flat or porous/fibrous, at densities comparable to those obtained on ceramic oxide substrates. Aligned carpets of carbon nanotubes can thus be obtained easily and simply on any substrate which can withstand the growth conditions. Thus, the incorporation of carbon nanotubes into composite materials with carbon fiber reinforcement can be done in a simple manner, with nanotubes that are advantageously dense, aligned, and attached to the fibers, making it possible to improve the mechanical, electrical, and thermal properties of said composites.

In particular, the invention minimizes the manipulation steps during the carbon nanotube preparation process. This process differs from the processes described in the literature, not only by its much better results in terms of density, length, neatness, and alignment of the carbon nanotubes, but also by the fact that no additional manipulation is necessary compared to the conventional nanotube growth as described in patent FR-2 841 233. The size of the carbon nanotubes obtained can easily be controlled, and production at a large scale is possible because of the ease of its implementation.

Because of the production yield, the invention also allows reducing the volumes of carbon nanotubes in the powdered state in contact with the user's skin and respiratory tract. Under these conditions, the manipulation at the end of the process, of coated substrates such as composite materials, is safer for the user because the risks associated with the presence of powdered carbon nanotubes are greatly decreased.

The invention therefore has an advantage over other carbon nanotube growth techniques, particularly the one described in document WO 2007/136613, in which the carbon nanotubes are deposited on catalysts which cover the surface of a carbon substrate, these catalysts being applied by immersing the carbon substrate in a catalytic solution or by electrodeposition. In that document, forming such a sub-layer of catalysts requires several steps in the process:

- a deposition step in which a layer of catalysts is deposited according to a first technique (for example by electrodeposition as stated in the document), and
- a second deposition step in which another technique is used (for example CVD) for the growth of the carbon nanotubes themselves.

The advantage of the invention is therefore apparent, as it provides for successively depositing the ceramic sub-layer and the carbon nanotubes in a single manipulation and in the same growth reactor.

BRIEF DESCRIPTION OF DRAWINGS

Other features and advantages of the invention will be apparent from the following detailed description and the attached drawings, in which.

DETAILED DESCRIPTION OF PARTICULAR EMBODIMENTS

Figure 15:
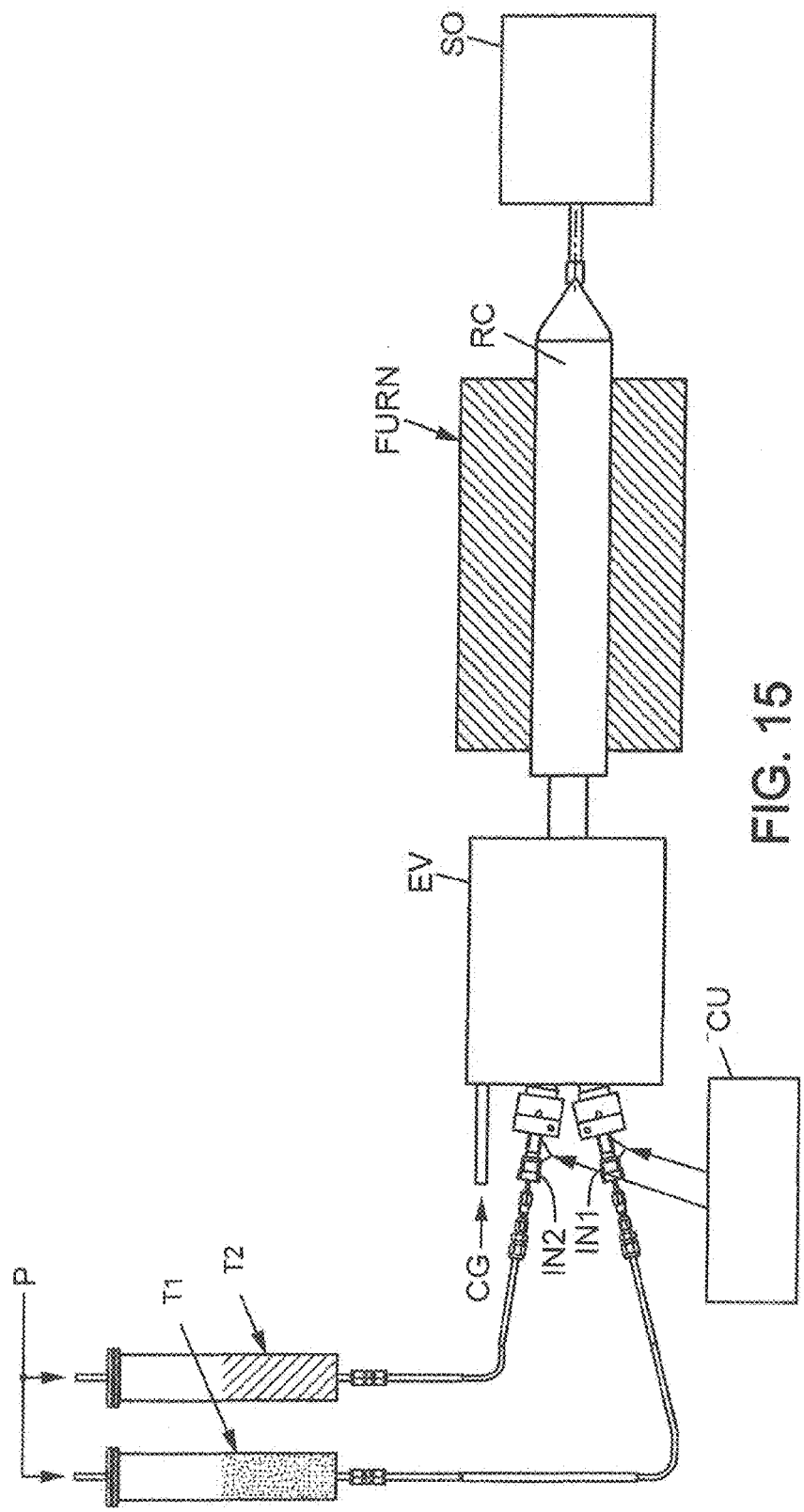

As shown in FIG. 15, the process is typically performed in a device comprising five distinct modules: at least one tank T1, at least one injector IN1, an evaporator EV, a reaction chamber RC (or "reactor"), and an evacuation system SO. This device is adapted for chemical vapor deposition CVD and in particular for growing carbon nanotubes. Generally, a hydrocarbon is employed in the first phase of the process, as the solvent for liquid A, in the circuit of tank T1. This hydrocarbon serves to support the vaporization. Only the ceramic precursor in the liquid A takes part in the growth of the sub-layer, as an organometallic compound. In the example represented, a second tank T2 and a second injector IN2 are used for the liquid B employed in the second phase of the process, in the circuit of the tank T2. The liquid B can comprise a hydrocarbon in which a metal precursor is dissolved (such as an organometallic compound) as a catalyst encouraging the growth of nanotubes. It thus constitutes the carbon source and provides the catalyst.

The evaporator and reactor are placed under vacuum then purged using a carrier gas CG. If non-oxide ceramic precursors were used, the entire device is first placed under vacuum and heated to limit any trace of oxygen and/or water to the extent possible.

The two separate tanks T1 and T2 correspond to two vessels containing the liquids, one used for the deposition of the sub-layer (liquid A) and the other for growing the carbon nanotubes (liquid B). These vessels are generally of stainless steel or quartz and are respectively connected to the inlets of the two injectors, by a line of a resistant material such as polytetrafluorethylene. The entire assembly is designed for exposure to a pressure P which routes the liquid towards the injector. The pressure is generated by introducing in the upper part of the vessel, meaning above the level of the liquid, a pressurized gas, typically at 1 to 5 times the atmospheric pressure. These vessels can be left at ambient temperature or at a higher temperature.

The injection part comprises two injectors IN1 and IN2, each connected to a tank and of the type used for injection in a heat engine in the automobile industry. An injection control unit CU is controlled by a system with a microprocessor. A ring connector attaches each injector to the evaporator EV, comprising a water circuit or a cooling fan and carrier gas CG inlets. As an example, the Jetpulse® injection system from Qualiflow® or the Vapbox® system from Kemstream® can be used.

In particular, such an injection system can be employed in pulsed mode, injecting at each activation a set of droplets of a given volume. Each injector comprises a needle valve that has a controlled open period and frequency. The open period controls the volume of the droplets and the total injection period is fixed by the injection frequency and the number of pulses.

The liquid contained in each tank is advantageously isolated from the evaporator by the associated injector valve, which avoids side reactions or preferential evaporation of the liquid due to heating the solution. Isolating the vessel/reactor also allows deposition at reduced pressure in the reactor.

The volume of droplets injected is controlled both by the difference in pressure between the vessel containing the liquid and the evaporator or reactor, and by the open period of the injector valve. The amount of liquid injected per unit of time (and therefore the flow rate) is controlled by the frequency at which the injector valve opens. This is controlled over time and can vary within a wide range. The user can thus control the amount of precursor as well as the mode of introduction. Such an embodiment gives great control over the morphology and thickness of the ceramic layers deposited, as well as the deposition conditions for the carbon nanotubes.

The device in FIG. 15 allows the use of liquids, and therefore of precursors, within a wide range of vapor pressures. The concentration of solid precursor can thus vary within a wide range. In particular, it is possible to use highly concentrated solutions.

This injection system is also suitable for using various liquid hydrocarbons such as cyclohexane and alkanes (hexane, heptane, octane, etc.). It additionally allows working at reduced pressures in the reactor for the deposition of thin oxide or non oxide layers.

The evaporator EV is composed of a heated metal vessel placed upstream from the reactor RC. The principle consists of evaporating the droplets emitted by the injection system. The reactor RC is arranged in a furnace FURN that is tubular or has a square cross-section, controlled by a temperature control device to perform depositions at a temperature of up to 1200° C.

Downstream from the reaction chamber RC is a gas evacuation unit SO, composed of a gas cooling system followed by a trap cooled to the temperature of ice and a bubbler in acetone. Alternatively, the traps can be replaced with a filtering system or liquid nitrogen trap(s).

EXPERIMENTAL RESULTS

Similarly to the above discussion, the sole purpose of the set of experimental results discussed below is to illustrate the invention and is not to be understood as limiting its scope.

In order to be able to observe and measure the deposited sub-layers, all manipulations are performed using the approach of either doing the sub-layer depositions only, or combining the two successive phases of growing the sub-layer followed by growing the carbon nanotubes. In addition, in all examples, the conditions are identical for growing the nanotubes on the pretreated substrates in the second phase. This is described in detail in the first example below, but the description is not repeated in the subsequent examples.

Of the substrates used for these depositions, a silicon control is always included to facilitate identifying sub-layer characteristics in terms of morphology and thickness. The other substrates used are substrates on which it is difficult to grow carbon nanotubes. These are stainless steel, carbon fibers, and graphite (or Papyex®, corresponding to a sheet composed of laminated graphic flakes), and metals such as palladium or molybdenum. The phases of the process are conducted in the same device, one after the other.

Example 1

Aligned Nanotubes Obtained on a Sub-Layer of Silica from Solutions of Tetraethylorthosilane (TEOS) in Toluene and Ferrocene in Toluene, in One Pass in the Same CVD Deposition Device The liquid hydrocarbon used is toluene (anhydrous) and the precursor of the silica sub-layer is Tetraethylorthosilane TEOS. For growing the nanotubes after deposition of the sub-layer, the metal (Fe) precursor acting as the catalyst is ferrocene. The carbon source is toluene. The TEOS is dissolved in anhydrous toluene and the ferrocene (solid) in toluene. The concentration of ferrocene in toluene is 2.5% by weight (the same is true in all the subsequent examples below). The resulting solutions are then each poured into a liquid vessel and a pressure of 1 bar of argon is applied in order to move the liquid towards the injector.

For the sub-layer deposition, several thicknesses were realized from a 1 mole per liter TEOS solution, by varying the injection periods.

a) Sub-Layer Deposition for 230 Seconds, Followed by Nanotube Growth for 15 Minutes 690 injections of droplets of TEOS/toluene solution are performed at a frequency of 3 Hz, with:
an open period of $2 \times 10^{-3}$ seconds for the needle valve,
a total injection period of 230 seconds, and
a mass of 1.72 grams per minute of injected solution.

The carrier gas is argon, at a flow rate of 2 liters per minute. The furnace temperature is 850° C.

Figure 1:
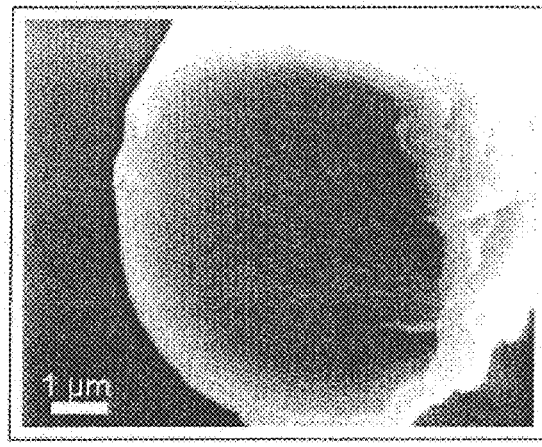
FIG. 1 represents an image (SEM imaging) of a silica sub-layer deposited after the first phase of the process of the invention (230 seconds after formation of the sub-layer)

Observation via scanning electron microscopy as illustrated in the image in FIG. 1 shows that the substrates which undergo this treatment in the reactor are covered by a silica layer about 400 nm thick (thickness corroborated by measurements with an electron microprobe).

Figure 2:
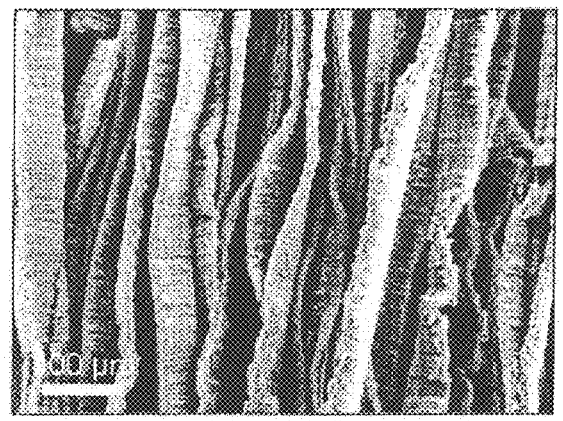
FIG. 2 represents an image (SEM) of non-woven carbon fibers coated with carbon nanotubes formed on fibers in the form of sheets, showing the carbon fiber at their base, FIG. 3 corresponds to a micrograph of woven carbon fibers coated with carbon nanotubes forming narrow carpets along the fibers, which in some areas are spread apart, showing the density of the constituent carbon nanotubes.

Then 15,930 injections of the ferrocene/toluene solution are performed, at a frequency of 17.7 Hz with an open period of $0.5 \times 10^{-3}$ sec for the needle valve, for a total reaction period of 15 minutes. Observations using scanning electron microscopy show in FIG. 2 the presence of sheets of aligned nanotubes forming a carpet on all substrates present in the reaction chamber, particularly on carbon fibers ("ex-PAN" type, meaning pyrolyzed polyacrylonitrile) and on metal substrates of stainless steel and palladium. The thickness of these sheets, which is the length of the nanotubes, is about 300 microns at 850° C. Under these synthesis conditions, only a very low proportion of subproducts remains within the carbon product, in the form of agglomerates of carbon particles.

Figure 3:
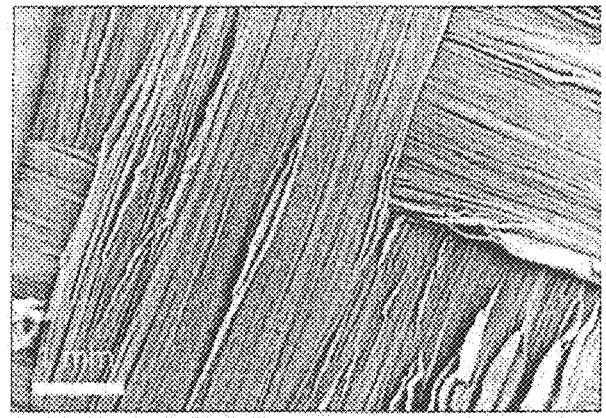

FIG. 3 shows the application of this process to growth on woven carbon fibers.

Figure 4:
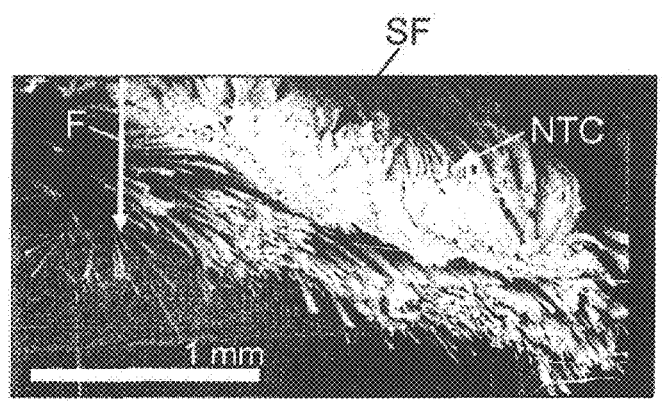
FIG. 4 represents the image (SEM) of a cross-section of a strand of the carbon fibers in FIG. 3, the fibers being coated with carbon nanotubes (NTC) forming narrow and parallel carpets that follow the surface fibers, with shorter nanotubes covering the underlying fibers and constituting a lower part.

In FIG. 4, observation of a bundle of carbon fibers SF within a weave which has undergone the process of the invention, shows that the nanotubes (NTC) mostly grow on the surface of the bundle SF (and therefore of the fabric). The direction of the initial reagent flow in the growth reactor is indicated by the arrow F. However, it can be seen that the silica sub-layer is present on a significant proportion of the bundle, and that short nanotubes have grown inside the bundle but are not developed to a significant extent, probably because of the steric obstruction and the lower diffusion of reagents between the fibers covered with nanotubes.

Figure 5:
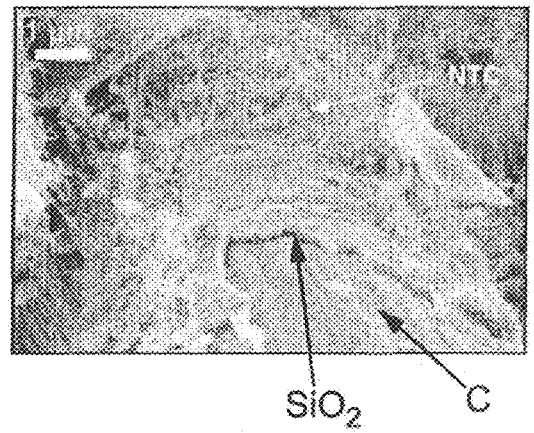
FIG. 5 represents a micrograph of a partially exposed carbon fiber after the second phase of the process, with carbon nanotubes (NTC) visible on the surface of a silica sub-layer ($SiO_2$) uniformly deposited on the surface of the carbon fiber (C)

In FIG. 5, which shows the details of the surface of a partially uncovered fiber, the silica sub-layer $SiO_2$ can clearly be seen conforming to the surface of the carbon fiber, with nanotubes (NTC) on top of it.

Figure 6:
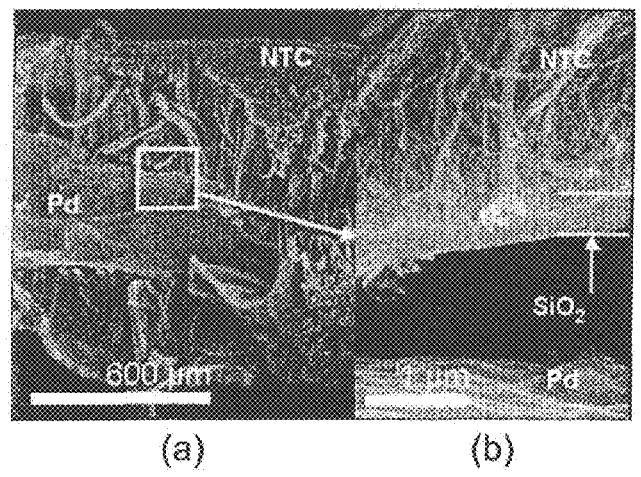
FIG. 6 represents a micrograph of a palladium wire (Pd) which has undergone the process of the invention, with FIG. 6(a) showing the density of the carbon nanotubes NTC formed, and FIG. 6(b) showing the details of the sub-layer $SiO_2$ pulled off the substrate Pd and supporting the carbon nanotubes (NTC)

The same process applied to a substrate of palladium Pd (generally threadlike in form) again shows a carpet growth of nanotubes (NTC). FIG. 6 shows the morphology of the nanotube (NTC) bases on the $SiO_2$ sub-layer which has been mechanically detached from the palladium substrate.

Figure 7:
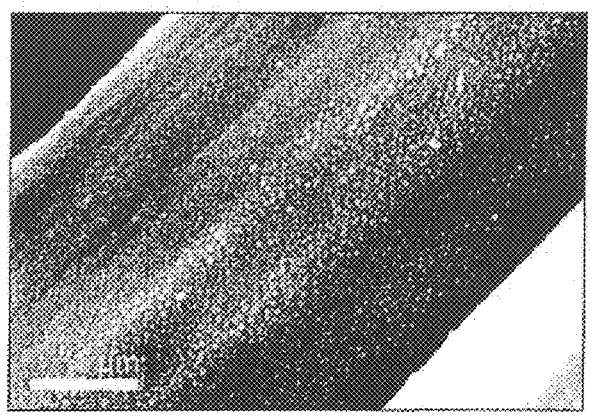
FIG. 7 represents a micrograph of a carbon fiber that has undergone the first phase of the process for only 60 seconds and is covered with a silica layer 250 nanometers thick.

The same observations were made on substrates of stainless steel and graphite.

b) Sub-Layer Deposition for 60 Seconds, Followed by Nanotube Growth for 15 Minutes In the first phase, 180 injections are made under conditions strictly identical to those described above, for a total period of 60 seconds. As is shown in FIG. 7, the substrates (carbon fibers) that only undergo sub-layer deposition show a layer of $SiO_2$ deposited on the surface, 250 nanometers thick (measured by electron microprobe).

Figure 8:
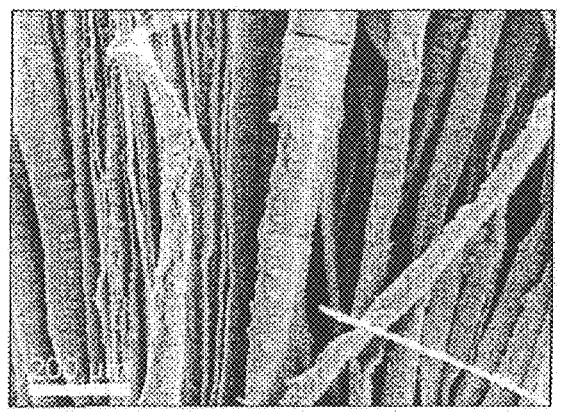
FIG. 8 represents a micrograph of the fibers of FIG. 7 after the second phase of the process, in particular with a carpet of dense and aligned carbon nanotubes.
Figure 9:
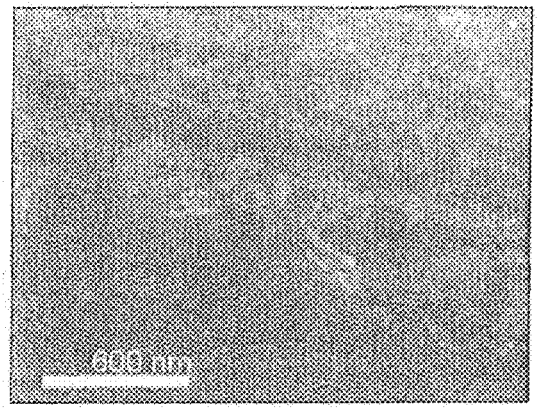
FIG. 9 represents a micrograph of a carbon fiber that has undergone the first phase of the process for only 23 seconds and is covered with a silica layer several dozen nanometers thick, FIG. 10 corresponds to a micrograph of fibers of FIG. 9 covered with carbon nanotubes.

During the second phase, one can see growth of dense nanotubes (NTC) aligned in a carpet all along the fibers, of an estimated length of 230 µm, as is illustrated in FIG. 8. The same observations were made on substrates of stainless steel and graphite.

c) Sub-Layer Deposition for 23 Seconds, Followed by Nanotube Growth for 15 Minutes 69 injections are performed under conditions strictly identical to those described above, for a total period of 23 sec. A very thin layer covers the carbon fibers which undergo this deposition, as is shown in FIG. 9. Electron microprobe measurements (composition measurement at various acceleration voltages and patterning) on the deposits reveal a thickness of about 140 nm.

Figure 10:
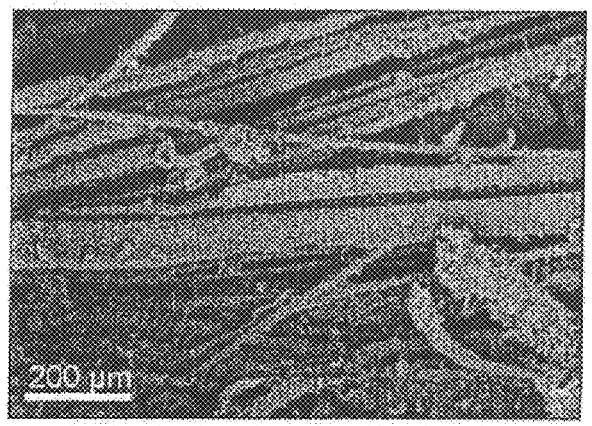

During the second deposition phase, nanotube growth can be seen on the treated fibers in FIG. 10. Generally, the nanotubes obtained are shorter (20 to 30 µm) when the sub-layer thicknesses are lower, which leads to anticipating a proportional relation between the sub-layer thickness and the length of the tubes, to a certain sub-layer thickness threshold. Even so, the growth occurs in a dense manner on the fiber surface, with the axis of the growing nanotubes substantially perpendicular to the surface of the substrate receiving the deposit. The length of the nanotubes can sometimes reach 100 µm on a minority of the fibers.

The same observations were made on substrates of stainless steel and graphite.

Example 2

Aligned Carbon Nanotubes, Deposited on a Sub-Layer of Alumina from Solutions of Aluminum Tributoxide in Toluene and Ferrocene in Toluene, in a Single Pass in the Same Device For the alumina layer deposition, a 1 mole per liter solution of aluminum tributoxide in toluene is used. The solution employed for the nanotube (NTC) growth phase consists of liquid hydrocarbon (toluene) acting as the carbon source and a precursor of the metal (Fe) acting as the catalyst (ferrocene). A pressure of 1 bar of argon is applied in order to push the liquid towards the injectors.

The sub-layer deposition is done in 230 seconds and followed by nanotube growth for 15 minutes. 690 injections of droplets of $(BuO)_3Al$/toluene solution are performed at a frequency of 3 Hz. The open period of the needle valve is $2 \times 10^{-3}$ sec. Argon is employed as the carrier gas, at a flow rate of 2 liters per minute. The furnace temperature is 850° C.

Figure 11:
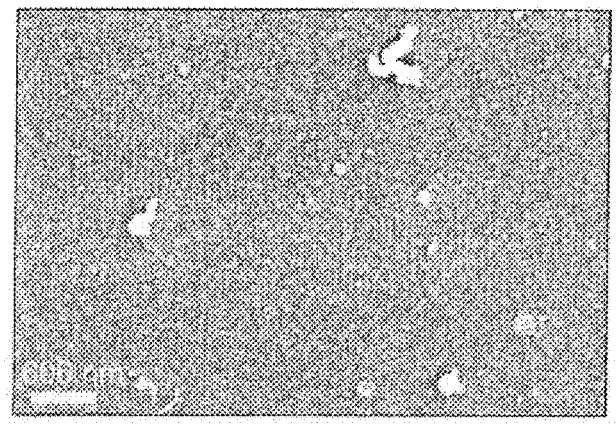
FIG. 11 shows a micrograph of a substrate of stainless steel covered with alumina, FIG. 12 corresponds to a micrograph of the substrate of FIG. 11 after growing the carbon nanotubes, FIG. 13 corresponds to a micrograph of carbon fibers covered with zirconium oxide, after growing the carbon nanotubes.

Observation under SEM microscope shows that the substrates of stainless steel and graphite which undergo this treatment in the reactor are covered by a very thin layer of alumina about 20 nm thick, as is shown in FIG. 11.

Figure 12:
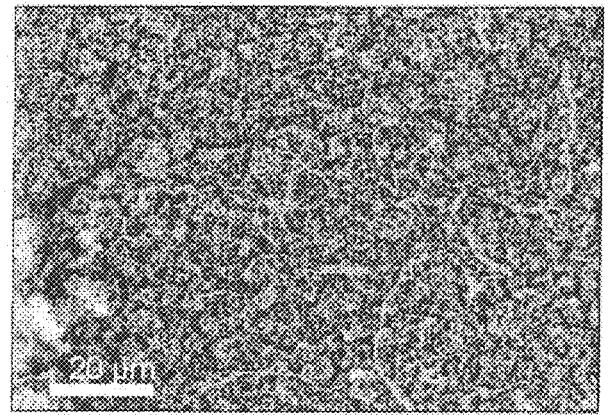

This first phase is followed by a nanotube growth phase. The pyrolysis temperature is 850° C. and the injection parameters are identical to those described in example 1. The layer of nanotubes (NTC) observed is short but appears as shown in FIG. 12. The thickness of the carpet obtained is estimated to be several dozen micrometers.

Example 3

Aligned Carbon Nanotubes, Obtained on a Sub-Layer of $ZrO_2$ from Solutions of Zirconium Tetrabutoxide in Toluene and Ferrocene in Toluene, in a Single Pass in the Same Device For the deposition of a zirconium oxide ($ZrO_2$) sub-layer, a 1 mole per liter solution of zirconium tetrabutoxide in toluene is used. The solution employed for the nanotube growth phase consists of toluene and ferrocene. A pressure of 1 bar of argon is applied in order to push the liquid towards the injectors.

The sub-layer deposition is done in 230 seconds. It is followed by nanotube growth for 15 minutes. 690 injections of droplets of $(BuO)_4Zr$/toluene solution are performed at a frequency of 3 Hz. The open period of the needle valve is $2 \times 10^{-3}$ seconds. The carrier gas is argon, at a flow rate of 2 liters per minute. The furnace temperature is 450° C.

Observation under a SEM microscope shows that the stainless steel and graphite which undergo this treatment in the reactor are covered by a layer of $ZrO_2$ about 35 nm thick. Analyses by EDS (Energy Dispersive Spectrometry) mapping of carbon fibers covered under these conditions show that zirconium is indeed present on the fibers.

This first phase is followed by a nanotube growth phase. The pyrolysis temperature is 850° C. and the injection parameters are identical to those described in example 1. A carbon deposit is obtained on the carbon fibers and the stainless steel substrates covered with $ZrO_2$, on the surface of which it is known to be very difficult to grow nanotubes without pretreatment.

Figure 13:
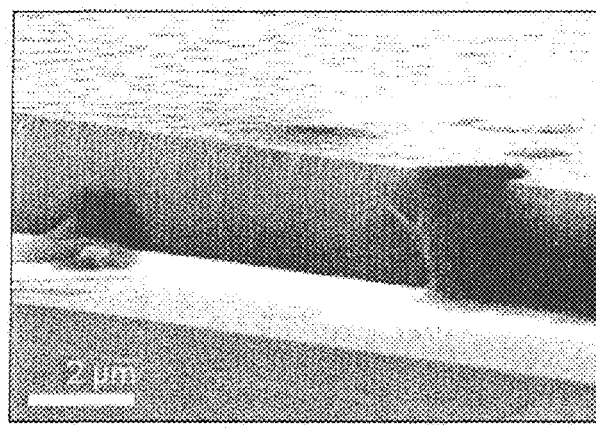

FIG. 13 shows the growth of nanotubes on fibers previously coated with a layer of $ZrO_2$. As was the case for the $SiO_2$ sub-layer, the nanotubes are seen to be grouped into sheets, with a length of 200 µm.

Depositions on stainless steel and graphite led to the same observations.

Example 4

Aligned Carbon Nanotubes, Obtained on a Sub-Layer of SiC or SiCN from Solutions of Hexamethyldisilazane or Tetrakis(Dimethylamino)Silane in Toluene and Ferrocene in Toluene, in a Single Pass in the Same Device For the deposition of non oxide ceramic layers, 1 mole per liter solutions of hexamethyldisilazane (HMDS) or tetrakis (dimethylamino)silane (4-DMAS) in toluene are used. The solution employed for the nanotube growth phase consists of toluene and ferrocene. A pressure of 1 bar of argon is applied in order to push the liquid towards the injectors.

The sub-layer deposition is done in 230 seconds and followed by 15 minutes of nanotube growth. 690 injections of droplets of HMSD/toluene solution are performed at a frequency of 3 Hz. The open period of the needle valve is $2\times10^{-3}$. The carrier gas is argon, at a flow rate of 2 liters per minute. The furnace temperature is 1000° C.

Observation by SEM shows that the silicon and stainless steel substrates which undergo this treatment in the reactor are covered by a layer about 2.2 μm thick. Analyses with electron microprobe indicate a mass percent composition of the layers of 33% silicon, 57% carbon, 6% nitrogen, and 4% oxygen.

This first phase is followed by a nanotube growth phase. The pyrolysis temperature is 850° C. and the injection parameters are identical to those described in example 1. A carbon deposition is obtained on the stainless steel substrates coated with deposited $SiC_xN_y$.

Figure 14:
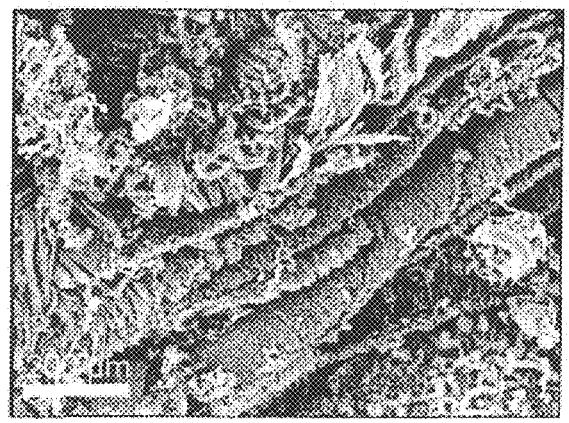
FIG. 14 shows a micrograph of a silicon substrate covered with a layer of $SiC_xN_yO_z$ deposited by vapor phase injection (injection CVD), before growing carbon nanotubes by the same technique (injection CVD), FIG. 15 schematically illustrates a device for implementing the invention, and for comparison.

FIG. 14 shows a profile of a similar layer deposited on silicon before the nanotube growth. The morphology is smooth and dense. Observations using SEM did not reveal any porosity within the layer.

Thus, the invention concerns the growth of carbon nanotubes, particularly by chemical vapor deposition (CVD), on materials where such growth is usually difficult such as carbon substrates (flat substrates, carbon fibers, graphite, carbon nanotubes themselves) or metal substrates. The invention also concerns the field of matrix composites (ceramic or metal or organic) and more specifically those that are carbon reinforced (composites with carbon fiber reinforcement in particular). The invention particularly relates to the application of a first phase of growing a sub-layer suitable for growing nanotubes on the surface of fibers, advantageously by CVD deposition techniques with direct liquid injection. This first phase is immediately followed by a second phase of growing nanotubes within the same reactor, for example without intermediate exposure to the air, or additional manipulation. The process allows sequentially performing the two phases in the same growth device, thus obtaining carbon fibers coated with dense and aligned nanotubes in a single global step.

COMPARISON WITH PRIOR ART RESULTS

Figure 16:
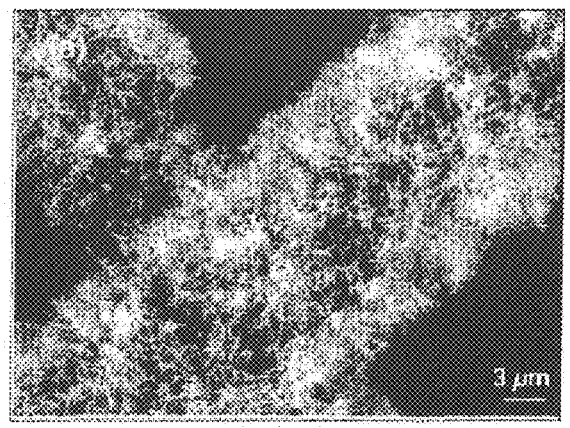
FIG. 16 shows nanotubes obtained by the prior art technique consisting of previously depositing a metal on the nanotubes as a catalyst, described in the document by Sonoyama et al., Carbon vol. 44, p. 1754 (2006).

FIG. 16 illustrates nanotubes deposited on carbon fibers, obtained by the prior art technique described by Sonoyama et al. in Carbon vol. 44, p. 1754 (2006). This technique consists of depositing, prior to growing the nanotubes, ferrocene ($FeCp_2$) in solution in xylene in order to provide the metal catalyst, at a temperature T1 of 800° C. for 30 seconds, then causing the nanotubes to grow at a temperature T2 of 1000° C. for 10 minutes while injecting xylene, without $FeCp_2$, at 0.024% by volume of $H_2S$. The fibers represented are covered with a nanotube "fuzz" which is not as dense and tightly packed as what is illustrated in FIG. 8, for example, where the nanotubes form a mat of fibers. In fact, FIG. 8 essentially shows carbon fibers on which the fuzz formed by the nanotubes (like a pile fabric) can be discerned due to a highlighting effect, the respective axes of these nanotubes clearly perpendicular to the substrate surface formed by the fibers. The length of the carbon nanotubes (NTC) obtained in this manner is limited (a few micrometers).

The invention claimed is:

1. A process for growing carbon nanotubes on a substrate, wherein there is provided:
a first phase of depositing a ceramic sub-layer on the substrate,
followed by a second phase of depositing carbon nanotubes on said ceramic sub-layer, the first phase and the second phase being performed successively in a single reactor without exposing the substrate to the outside atmosphere between the first phase and the second phase.

2. The process according to claim 1, wherein the substrate comprises a carbon-containing surface receiving at least a part of the deposited ceramic sub-layer.

3. The process according to claim 1, wherein the substrate comprises a metal surface receiving at least a part of the deposited ceramic sub-layer.

4. The process according claim 1, wherein the growth of the sub-layer and the nanotubes is realized by chemical vapor deposition.

5. The process according to claim 1, wherein the ceramic sub-layer is deposited by pyrolysis, in the reactor, of a first liquid containing a precursor of said ceramic.

6. The process according to claim 1, wherein the carbon nanotubes are deposited by pyrolysis, in the reactor, of a second liquid containing a carbon precursor.

7. The process according to claim 6, wherein the second liquid additionally comprises a metal precursor providing the catalyst for growing the nanotubes.

8. The process according to claim 5, wherein said reactor is located downstream of an evaporator and said first liquid is introduced by spraying in droplet form in the evaporator.

9. The process according to claim 6, wherein said reactor is located downstream of an evaporator and said second liquid is introduced by spraying in droplet form in the evaporator.

10. The process according to claim 8, wherein the droplets are introduced into the evaporator by pulses of a chosen frequency.

11. The process according to claim 1, wherein the sub-layer is deposited at a pressure in the range of 30 to 150 mbar and the carbon nanotubes are deposited at a pressure in the range of 200 to 1000 mbar.

12. The process according to claim 1, wherein the first and second phases are conducted at temperatures between 200 and 1200° C.

13. The process according to claim 1, wherein the length of the carbon nanotubes is proportional to the thickness of the ceramic sub-layer.

14. The multilayer structure obtained by implementing the process according to claim 1, comprising a layer of carbon nanotubes deposited on at least one ceramic sub-layer.

15. The structure according to claim 14, wherein the carbon nanotubes deposited on the ceramic sub-layer have a density on the order of $10^9$ to $10^{10}$ nanotubes per $cm^2$.

16. A reinforcement fiber covered with a multilayer structure according to claim 13.

17. A reinforcement fiber covered with a multilayer structure according to claim 14.

18. An organic matrix composite material, incorporating at least one reinforcement fiber according to claim 16.

19. A metal substrate covered with a multilayer structure according to claim 13.

20. A metal substrate covered with a multilayer structure according to claim 14.

21. A material for storing energy, comprising a substrate according to claim 19.

22. The process according to claim 1, wherein said process is implemented in a device, the device comprising said reactor and an evaporator located upstream of said reactor, said reactor receiving at least a ceramic precursor and a carbon precursor, the device further comprising a system for injecting said ceramic precursor and said carbon precursor in the form of liquid droplets into the evaporator.

* * * * *